(12) United States Patent
Forsthoevel et al.

(10) Patent No.: US 8,926,314 B2
(45) Date of Patent: Jan. 6, 2015

(54) TRANSPORT DEVICE AND TRANSPORT METHOD FOR CONTAINER TREATMENT PLANT AS WELL AS BLOW MOLDING MACHINE

(71) Applicant: Krones AG, Neutraubling (DE)

(72) Inventors: Jochen Forsthoevel, Regensburg (DE); Franz Gmeiner, Sinzing Ortsteil Eilsbrunn (DE)

(73) Assignee: Krones AG, Neutraubling (DE)

( * ) Notice: Subject to any disclaimer, the term of this patent is extended or adjusted under 35 U.S.C. 154(b) by 109 days.

(21) Appl. No.: 13/760,701

(22) Filed: Feb. 6, 2013

(65) Prior Publication Data

US 2013/0216642 A1 Aug. 22, 2013

(30) Foreign Application Priority Data

Feb. 16, 2012 (DE) .......................... 10 2012 101 238

(51) Int. Cl.
*B29C 49/42* (2006.01)
*B29C 49/70* (2006.01)
*B29C 31/08* (2006.01)
*B65G 29/00* (2006.01)

(52) U.S. Cl.
CPC ............ *B65G 29/00* (2013.01); *B29C 49/4205* (2013.01); *B29C 49/421* (2013.01)
USPC ...................... 425/534; 198/346.3; 198/468.6; 198/566; 198/567; 425/537; 425/540

(58) Field of Classification Search
CPC .............. B29C 49/4205; B29C 49/421; B29C 2049/4221

USPC .................. 198/346.3, 468.6, 562, 566, 567; 425/534, 537, 540
See application file for complete search history.

(56) References Cited

U.S. PATENT DOCUMENTS

| | | | | |
|---|---|---|---|---|
| 1,015,319 | A | * 1/1912 | Jefferies et al. | 198/567 |
| 3,621,523 | A | * 11/1971 | Dicks et al. | 425/4 R |
| 5,044,922 | A | * 9/1991 | Plenzler et al. | 425/503 |
| 5,509,796 | A | 4/1996 | Di Settembrini | |
| 6,152,723 | A | * 11/2000 | Winter et al. | 425/526 |
| 2005/0121104 | A1 | * 6/2005 | Monzel | 141/144 |

FOREIGN PATENT DOCUMENTS

| | | |
|---|---|---|
| DE | 694 04 400 | 1/1994 |
| DE | 19906309 A1 | 8/2000 |
| DE | 10325693 A1 | 7/2004 |

(Continued)

OTHER PUBLICATIONS

EPO Search Report dated May 31, 2013 (App. No. 12196354.0-1706), and English translation.
Search Report dated Oct. 26, 2012 in priority app'n No. DE102012101238.5.

*Primary Examiner* — Robert B Davis
(74) *Attorney, Agent, or Firm* — D. Peter Hochberg; Sean F. Mellino; Richard A. Wolf

(57) ABSTRACT

A transport device and a transport method for a container treatment plant as well as a blow molding machine is provided. The transport device comprises at least one transport star for transporting receptacles to or away from a treatment station of the container treatment plant, wherein the at least one transport star is arranged obliquely to the treatment station.

10 Claims, 3 Drawing Sheets

(56) References Cited

FOREIGN PATENT DOCUMENTS

| DE | 202004021491 U1 | 6/2008 |
| EP | 2412651 A1 | 2/2012 |
| EP | 2460747 | 6/2012 |
| FR | 2917392 A1 | 12/2008 |
| WO | WO 2006/097796 A2 | 9/2006 |
| WO | WO 2009/109829 | 9/2009 |
| WO | WO 2010/112307 | 10/2010 |

* cited by examiner

TRANSPORT DEVICE AND TRANSPORT METHOD FOR CONTAINER TREATMENT PLANT AS WELL AS BLOW MOLDING MACHINE

CROSS-REFERENCE TO RELATED APPLICATION

This application claims foreign priority based on German patent application DE 10 2012 101 238.5, filed on Feb. 16, 2012, the content of which is incorporated herein by reference in its entirety.

BACKGROUND OF THE INVENTION

1. Field of the Invention

The invention relates to a transport device and a transport method for a container treatment plant as well as a blow molding machine.

2. Description of the Prior Art

A container treatment plant which may be a blow molding machine, cleaning machine, filling machine, labeling machine, etc., for example, is used in particular in the beverage industry for producing containers. Containers are in particular bottles produced of parisons (preforms) made of synthetic material. Receptacles are to be understood as parisons as well as bottles or containers which are produced thereof. The receptacles are transported to the container treatment plant and away from the container treatment plant by a transport device.

Currently, blow molding machines are known in the prior art, in which multiple blowing stations form together essentially a ring, the blowing wheel. In each blowing station, a parison can be transformed in a container for accommodating a beverage, for example. The blowing stations rotate like a carrousel around a point or spot, such that the blowing stations each can dispense one after another a finished container to a transport device at a fix handover point and, directly thereafter, can accommodate again a new parison from the transport device, which parison is to be treated in the blowing station. Due to the rotation, considerable mass-forces act on the blowing stations as well as their input elements and output elements. This requires a specific construction capable to absorb the acting mass-forces without any difficulty. Such a construction is intricate and thus expensive. Additionally, a lot of energy is needed for the rotation of the blowing stations. This results in comparable high operating costs.

WO 2010/112307 A1 shows a stationary blow molding machine having multiple blow molds arranged in a stationary blowing wheel. In such a blow molding machine, a rotation of the blow molds can be avoided.

In hitherto contemplated concepts for supplying the stationary blow molding machine with parisons and removing finished containers from the blow molding machine, it was preferred, to realize the same transfer times. However, the mechanism necessary for this purpose in a stationary blow molding machine was hitherto quite complicated. Due to this, the production costs for the transport device for transporting parisons to the blow molding machine and containers away from the blow molding machine are currently still higher than in a blow molding machine having rotating blowing stations.

SUMMARY OF THE PRESENT INVENTION

Thus, it is an object of the invention to provide an improved transport device and an improved transport method for a container treatment plant as well as an improved blow molding machine, in which the supply of the preferably stationary container treatment plant with parisons and the removal of finished containers from the container treatment plant realize the same transfer times and in which the production costs and the operation costs of the container treatment plant are reduced.

The object is solved by a transport device for a container treatment plant, which transport device has at least one transport star for transporting receptacles to or away from a treatment station of the container treatment plant, wherein the at least one transport star is arranged obliquely to the treatment station.

With the described transport device it can be realized, due to the arrangement of the transport star obliquely to the treatment station, that a same transfer time to the individual treatment stations can be ensured. The same transfer time can thus be realized with a very simple mechanism, even if the container treatment plant is arranged stationary or is rotated with a lower velocity than currently known.

Such a transport device and the container treatment plant fed with receptacles have a relative small configuration. Thereby, also the centrifugal forces occurring in the container treatment plant are reduced. In addition, the required space of the whole blow molding machine is reduced due to the comparable small configuration.

With the described transport device, it can be achieved, that only the receptacles are to be transported relative to the container treatment device. Therewith, it is no longer necessary to move the treatment stations of the container treatment plant.

Due to the described construction of the transport device, both the production costs and the operation costs of the container treatment plant can be lowered considerably compared to the prior art.

Advantageous further developments of the transport device are given in the dependent claims.

It is advantageous; in case the at least one transport star comprises a first transport star for transporting receptacles to a treatment station of the container treatment plant and a second transport star for transporting the receptacles away from the treatment station of the container treatment plant, wherein the first transport star and/or the second transport star are/is arranged obliquely to the treatment station. With the described transport device, it can be realized due to the arrangement of the first and/or second transport star obliquely to the treatment station, that both the supply of the first transport star with the receptacles and the removal of receptacles from the second transport star emanates from one point or spot which ensures the same transfer time to the individual treatment stations. In addition, such a transport device and the container treatment plant fed with receptacles by the transport device have a relative small construction as well as the advantages mentioned above.

Preferably, the first and second transport star and the treatment station are movable relative to each other.

It is possible that the first transport star is rotatable around a first rotation axis and the second transport star is rotatable around a second rotation axis, and that the first and second transport stars are rotatable together around a third rotation axis.

Preferably, the first and second rotation axes are each arranged obliquely to the third rotation axis, and/or the first rotation axis is arranged in parallel to the second rotation axis.

It is advantageous that the first transport star is arranged adjacent to the second transport star, such that the treatment station is arrangeable at the outside of a ring in which the first and second transport stars are arranged.

Advantageously, the first transport star is arranged, such that it can take over the receptacles at a spot in the center of the ring to transport them to the treatment station, and the second transport star is arranged, such that it can hand over the receptacles at a spot in the center of the ring after having transported them. Because of this construction of the transport device, the supply of the first transport star with the parisons and the container removal from the second transport star each emanate from a spot being located on the axis through the center of the ring formed together by the blowing stations. This is the ideal case for securing the same transport times to the individual blowing stations.

The transport device can further comprise a tubular element for supplying a treatment station of the container treatment plant with parisons, wherein a transport star of the at least one transport star, which is arranged obliquely to the treatment station, serves for transporting the receptacles away from the treatment station of the container treatment plant.

In a preferred development, the container treatment plant can be a blow molding machine or a cleaning machine or a filling machine or a labeling machine.

The above-described transport device can be part of a blow molding machine for producing containers, for accommodating a product, from parisons. The blow molding machine has a plurality of blowing stations forming together a ring and being for shaping a container from a parison. The transport device serves for transporting one parison each to one of the plurality of blowing stations and for transporting one container each away from one of the plurality of blowing stations.

It is advantageous, in case the plurality of blowing stations are arranged fixedly or stationary compared to the first and second transport stars of the transport device.

The above-mentioned object is further solved by a transport method for a container treatment plant, which transport method comprises the step of transporting receptacles to or away from a treatment station of the container treatment plant by a transport star, wherein the transport star is arranged obliquely to the treatment station.

The transport method achieves the same advantages as they are mentioned above with reference to the transport device.

Further possible implementations of the invention comprise also combinations of features or styles described above or in the following with reference to the embodiments, even if they are not explicitly mentioned. Herein, the person skilled in the art will also add single aspects as improvements or additions to the respective basic form of the invention.

Further developments of the invention are subject matter of the embodiments of the invention, described in the following.

BRIEF DESCRIPTION OF THE DRAWINGS

In the following, the invention is described in more detail by means of embodiments and with reference to the appended drawing Figures, wherein.

In the figures, the same or functionally same elements are provided with the same reference signs unless given otherwise.

DETAILED DESCRIPTION OF THE PRESENT INVENTION

Figure 1:
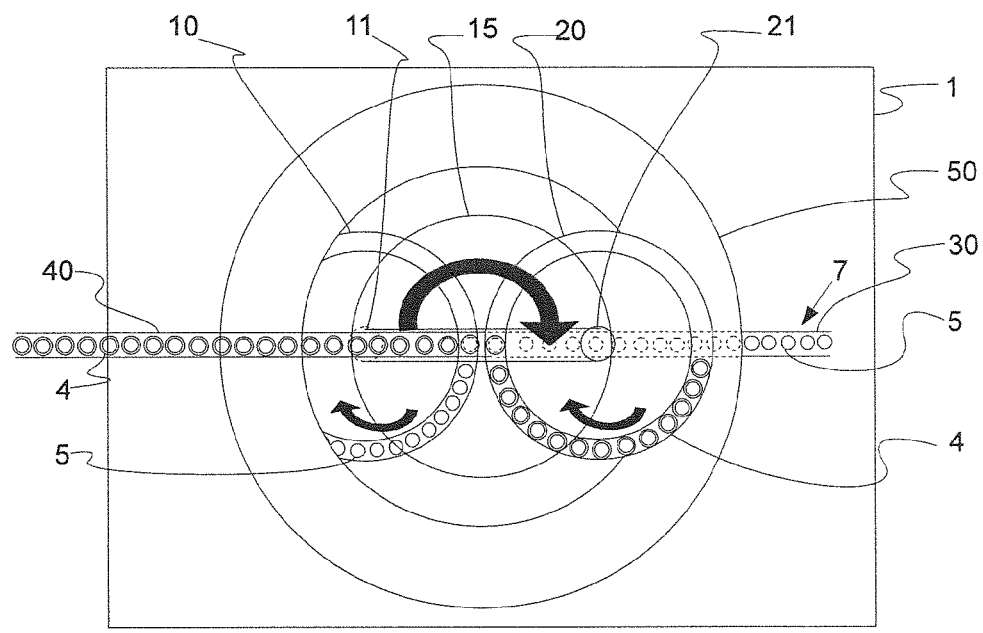
FIG. 1 shows a schematic top view of a container treatment plant having a transport device according to a first embodiment.

FIG. 1 shows a container treatment plant 1 for treating containers 4 and/or parisons 5. In the container treatment plant 1 in FIG. 1, the containers 4 are producible from the parisons 5. The parisons 5 are made of synthetic material, as polyethylene terephthalate (PET), polypropylene (PP) etc., and are also containers, even if they are still unfinished containers or containers untreated by the container treatment plant 1. The finished containers 4 can be bottles, for example, in which a product can be filled. The product can be in particular a beverage, a detergent, etc. In FIG. 1, the containers 4 are depicted each as concentric circles and the parisons 5 are depicted each as a circle, wherein only some of the containers 4 and parisons 5 in FIG. 1 are provided with a reference sign for the sake of clear depiction.

In FIG. 1, the container treatment plant 1 comprises a transport device 7 and a blow molding machine 50. The transport device 7 has a first transport star 10, a second transport star 20, a first transport rail 30, and a second transport rail 40. The blow molding machine 50 is shown in FIG. 1 only very schematically. In the blow molding machine 50, the parisons 5 can be blown into the desired form of the container 4 by blowing a gaseous medium therein. The blow molding machine 50 may be in particular a stretch blow molding machine.

The first transport star 10 rotates in the direction of the small black rotation arrow in FIG. 1 and around a first rotation axis 11 arranged in the center of the first transport star 10. The first transport star 10 takes over the parisons 5 supplied and transported by the first transport rail 30 and supplies the blow molding machine 50 therewith.

The second transport star 20 rotates likewise in the rotation direction given by the small black rotation arrows in FIG. 1 and around the second rotation axis 21 arranged in the center of the second transport star 20. The second transport star 20 takes over the containers 4 finished by the blow molding machine 50 and hands them over to the second transport rail 40. The second transport rail 40 leads for example to a cleaning machine which is not shown, a filling machine which is not shown, etc.

Figure 2:
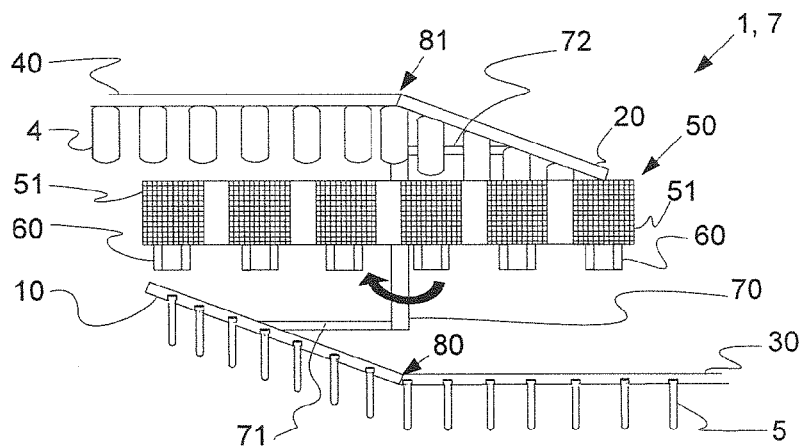
FIG. 2 shows a schematic side view of the container treatment plant having the transport device according to the first embodiment.

The first transport star 10 rotates together with the second transport star 20 in the rotation direction shown in FIG. 1 by the bold black rotation arrow, as also depicted in even more detail in FIG. 2. Due to this arrangement, the center of the first transport star 10, which center is located on the first rotation axis 11, and the center of the second transport star 20, which center is located on the second rotation axis 21, each move on a circuit 15 inside of the ring formed by the blow molding machine 50. This ring is also named blowing wheel. The circuit 15 is concentrically to the circuit of the blowing wheel of the blow molding machine 50, however, the circuit 15 has a smaller diameter than the circuit of the blowing wheel, preferred only the half diameter of the circuit of the blowing wheel of the blow molding machine 50, as shown in FIG. 1.

FIG. 2 illustrates the container treatment plant 1 of FIG. 1 in the side view in more detail. As shown in FIG. 2, the first transport star 10 is arranged obliquely to the first transport rail 30 and is also arranged obliquely to the blow molding machine 50. The blow molding machine 50 has a plurality of blowing stations 51, which each can accommodate one parison 5 to reshape it to the container 4 by blowing a gaseous medium therein. Blowing stations 51 are also named treatment stations 51 hereafter. The first transport star 10 is also arranged obliquely to each blowing station 51. Below each blowing station 51 is arranged a heating device 60. Moreover, also the second transport star 20 is arranged obliquely to the blow molding machine 50 and is also arranged obliquely to each blowing station 51. Further, the second transport star 20 is arranged obliquely to the second transport rail 40.

Accordingly, the first and second transport star 10, 20 are arranged adjacent, preferably in parallel to each other, in FIG. 2. In addition, the first and second transport rail 30, 40 and the blow molding machine 50 are arranged adjacent, preferably in parallel to each other. The first transport star 10 and the second transport star 20 are rotatable together around a third rotation axis 70 in the rotation direction given by the small black rotation arrow in FIG. 2. For this purpose, the first transport star 10 is connected with the third rotation axis 70 by a first girder or beam 71. Further, the second transport star 20 is connected with the third rotation axis 70 by the second girder or beam 72.

The first transport rail 30 thus guides the parisons 5 to the first transport star 10 at a spot 80 being located on an extension of the third rotation axis 70. Likewise, the second transport star 20 hands over the finished containers 4 to the second transport rail 40 at a spot 81 being located on an extension of the third rotation axis 70.

The heating devices 60 in FIG. 2 can heat the parisons 5 each to the necessary temperature, the reshaping temperature, in order that the parisons 5 can be reshaped in the form of the desired finished containers 4 in the blowing station 51 by blowing a gaseous medium therein. In stretch blow molding machines, the containers are also stretched by a stretching bar.

In the above described container treatment plant 1, the transport device 7 ensures, that the supply of the first transport star 10 with parisons 5, what means the handover from the transport rail 30 to the first transport star 10, and the container removal from the second transport star 20, what means the handover from the second transport star 20 to the second transport rail 40, each emanate from a fix spot 80, 81. These spots 80, 81 are located each on the axis through the center of the ring which the blowing stations 51 form together. The axis through the center of the ring of the blow molding machine 50 is in FIG. 1 the rotation axis 70. Therewith, the same transfer time for the parisons 5 to the individual blowing station 51 can be ensured. Where exactly the spots 80, 81 are arranged in the middle of the ring of the blow molding machine 50 complies also with the construction of the device with which the parisons 5 are transported to the first transport star 10 and which transports the containers 4 away from the second transport star 20.

Thus, the supply of the first transport star 10 with the parisons 5 takes place at a spot 80 being located in another plane than the spot 81 at which the second transport star 20 takes over the containers 4 out of the center of the ring, the blow molding machine 50, formed by the blowing stations 51.

In FIG. 1 and FIG. 2, the spot 81 is located in a plane above the plane in which the spot 80 is located. The rotation planes of the first and second transport stars 10, 20 are inclined differently in comparison to the plane of the ring formed by the blowing stations 51.

Figure 3:
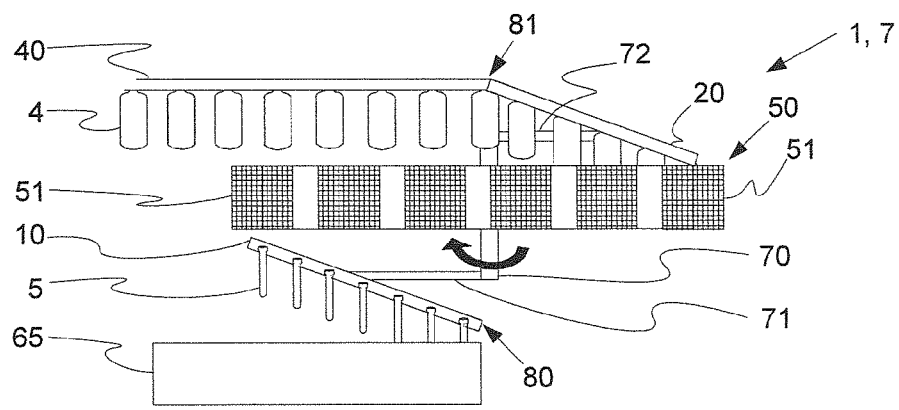
FIG. 3 shows a schematic side view of a container treatment plant having a transport device according to a first modification of the first embodiment.

FIG. 3 shows a first modification of the first embodiment as a modification of the container treatment plant 1 and the transport device 7 thereof in a side view. The modified container treatment plant 1 is constructed in many parts in the same way as the container treatment plant 1 of the first embodiment. Therefore, only the differences between the first embodiment and its first modification are described in the following. For the rest, it is referred to the description of the first embodiment.

In contrast to the first embodiment, the modified container treatment plant 1 comprises a linear heating device 65 instead of the heating devices 60 allocated individually to each blowing station 51. In the linear heating device 65, the parisons 5 are transported along a heating path (not shown) having infrared radiators (not shown) and are heated thereby. The linear heating device 65 is depicted in FIG. 3 only very schematically, since the linear heating device is well known in the prior art.

In the first modification of the first embodiment, the parisons 5 pre-heated by the linear heating device 65 are thus handed over to the first transport star 10 which supplies them one after another in a row to the individual blowing stations 51. Therewith, the first transport rail 30 can be omitted in this modification of the first embodiment or it is part of the linear heating device 65.

Figure 4:
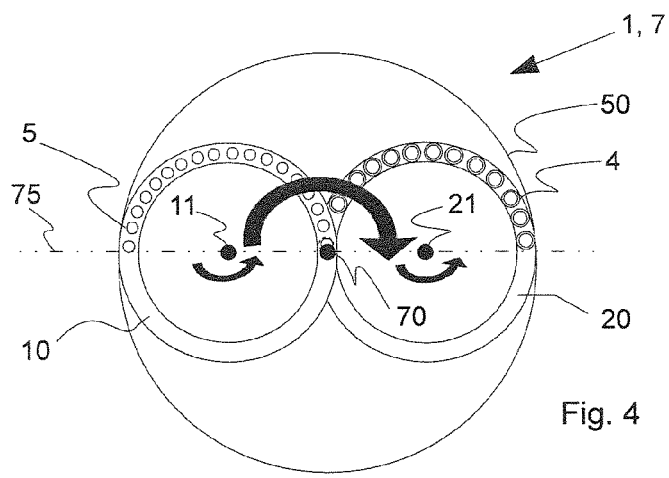
FIG. 4 shows a schematic top view of a container treatment plant having a transport device according to a second modification of the first embodiment.

FIG. 4 shows a second modification of the first embodiment, in which the container treatment plant 1 and the transport device 7 thereof are depicted in a simplified top view. The first and second transport rails 30, 40 are not depicted. Here, the first and second transport stars 10, 20 each lead or rotate exactly through the extension of the third rotation axis 70. Further, the first to third rotation axes 11, 21, 70 are located on the dashed-dotted line 75, a straight line. That is, the first and second rotation axis 11, 21 are arranged with an angle of 180° in between. Moreover, the first and second transport stars 10, 20 rotate in the same direction around their rotation axis 11, 21, respectively, whereas they are rotated together in an opposite direction thereto around the third rotation axis 70. In the case shown in FIG. 4, the parisons 5 are guided from above to the blow molding machine 50, such that also the heating devices 60 are arranged here above the blowing stations 51. In contrast thereto, the finished containers 4 are removed downwards.

Figure 5:
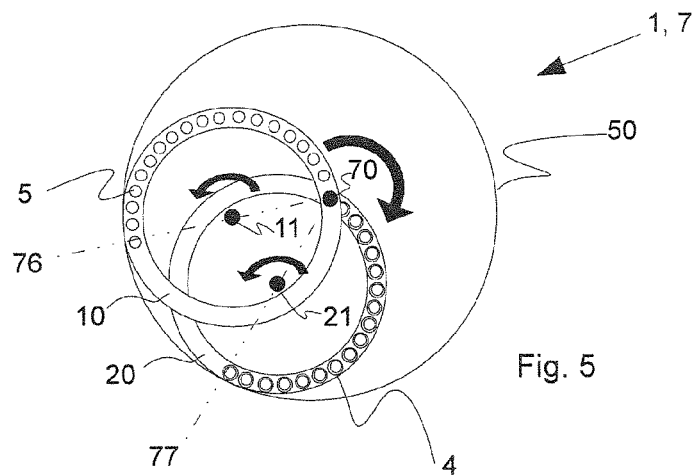
FIG. 5 shows a schematic top view of a container treatment plant having a transport device according to a third modification of the first embodiment.

FIG. 5 shows a third modification of the first embodiment in which the container treatment plant 1 and the transport device 7 thereof are depicted in a further simplified top view. The first and second transport rail 30, 40 are again not shown. In this modification, the first and second transport star 10, 20 are arranged closer to each other and rotate together around the third rotation axis 70. That is, the first and second rotation axis 11, 21 are arranged with a smaller angle than 180° in between, namely with an angle located between the dashed-dotted lines 76 and 77, which measures in FIG. 5 about 50°. Thereby, the first to third rotation axes 11, 21, 70 are no longer arranged on a straight line. However, the first and third rotation axes 11, 70 are located in this case on the dashed-dotted line 76. The second and third rotation axes 21, 70 are located on the dashed-dotted line 77. Also here, the first and second transport stars 10, 20 rotate in the same direction around their rotation axis 11, 21, respectively, whereas they are rotated together in a direction opposite thereto around the third rotation axis 70. In the case shown in FIG. 5, the parisons 5 are lead to the blow molding machine 50 from above, so that also the heating devices 60 are arranged here above the blowing stations 51. In contrast thereto, the finished containers 4 are transported downwards.

In the implementation alternative shown in FIG. 5, a smaller dead angle is present between taking a finished container 4 out of a certain blowing station 51 (at the dashed-dotted line 77 at the blow molding machine 50) and loading of this certain blowing station 51 (at the dashed-dotted line 76 at the blow molding machine 50) with a parison 5 compared to the implementation alternatives shown in FIG. 1 to FIG. 4. Therefore, the implementation alternative shown in FIG. 5 is more advantageous with respect to minimizing the dead angle than the implementation alternatives shown in FIG. 1 to FIG. 4.

Figure 6:
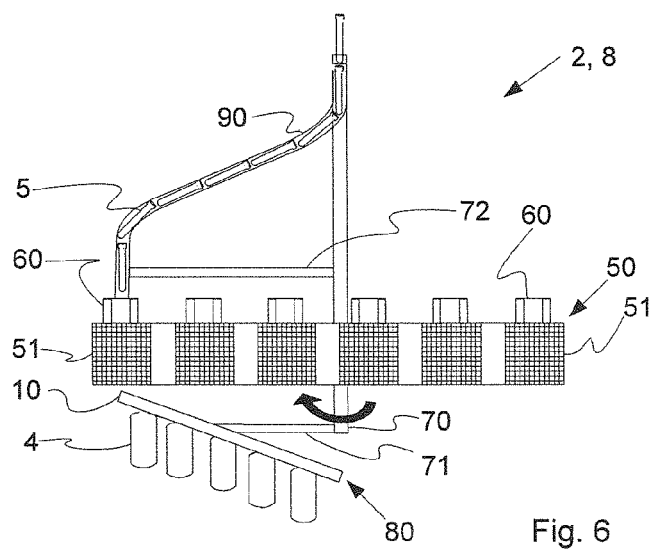
FIG. 6 shows a schematic top view of a container treatment plant having a transport device according to a second embodiment.

FIG. 6 shows a container treatment plant 2 according to a second embodiment, which comprises only one transport star 20. The transport star 20 transports the receptacles, the finished containers 4, away from the blowing stations 51. The transport star 20 is rotatable around its own axis, the second rotation axis 21, and around the third rotation axis 70 in the rotation direction given by the small black rotation arrow in FIG. 4. Instead of the first transport star 10, a tubular element 90, for example a bendable or flexible tube, a hose, etc., in particular made of synthetic material, etc., is provided in this embodiment, which tubular element 90 supplies the blowing stations 51 with parisons 5. The tubular element 90 is fixed together with the transport star 20 to the third rotation axis 70 by the beam 72 and is rotatable in the rotation direction given by the small black rotation arrow in FIG. 6.

In the construction shown in FIG. 6, the parisons 5 are introduced in the tubular element 90 from above, preferably after being separated and aligned, which is not shown, and get through the tubular element 90 to the heating device 60 which is arranged here above the blowing stations 51. Herein, the parisons 5 can be driven by their own weight and/or with compressed air. Possibly, a transport rail (not shown) can be present between the tubular element 90 and the heating device 60. In FIG. 6, an alternative is shown in which the parisons 5 stabilize each other in the tubular element 90. In this alternative, no accumulation or jam can arise by catching the parisons 5 in the tubular element 90. In a further alternative which is not shown and in which the parisons 5 are shot individually through the tubular element 90, no jam can develop in the tubular elements 90.

Thus, the tubular element 90 guides the parisons 5 from a spot 80 being located on an extension of the third rotation axis 70 to the individual blowing stations 51. The transport star 20 hands over the finished containers 4 to the transport rail 40 at a spot 81 being located on an extension of the third rotation axis 70.

More generally spoken, also only one transport star can be present in this embodiment in the container treatment plant 2 instead of the first and third transport stars 10, 20, wherein the one transport star transports the yet unfinished or untreated receptacles, the parisons 5, which are not yet treated by the treatment device 2 to the blowing stations 51, or wherein the one transport star transports receptacles treated by the treatment device 2, the finished containers 4, away from the blowing stations 51. The other process, transporting to the blowing stations 51 or transporting away from the blowing stations 51, respectively, can be performed in another way.

Figure 7:
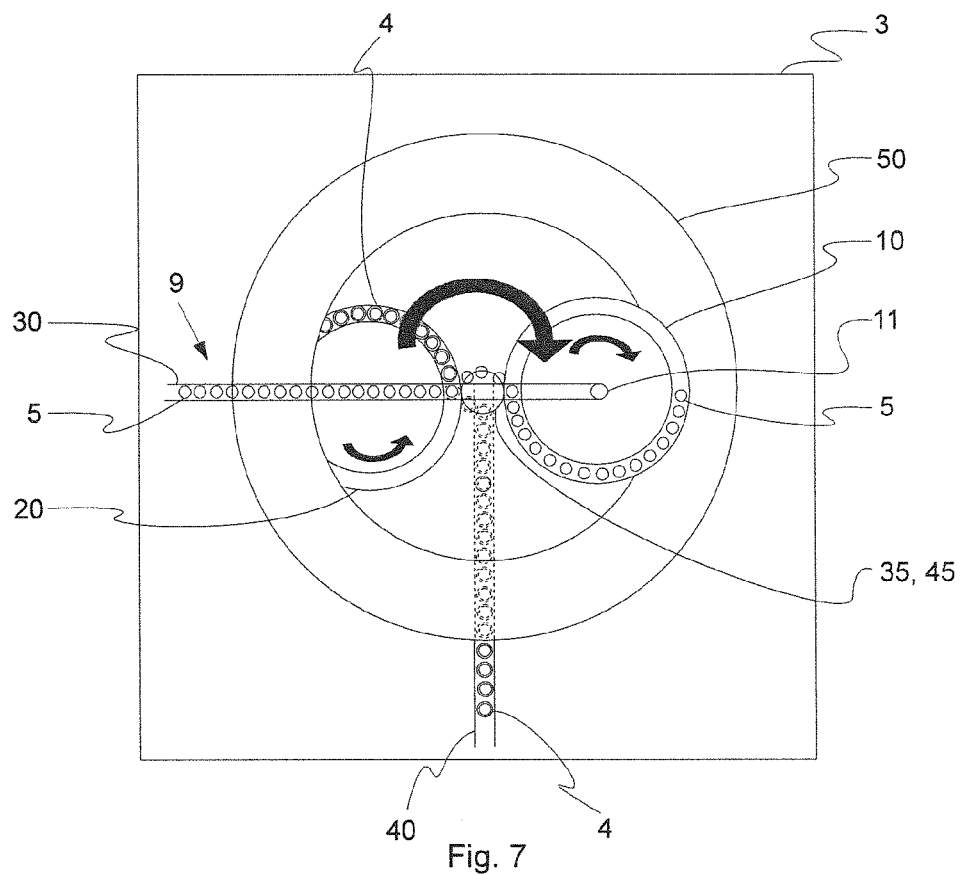
FIG. 7 shows a schematic top view of a container treatment plant having a transport device according to a third embodiment.
Figure 8:
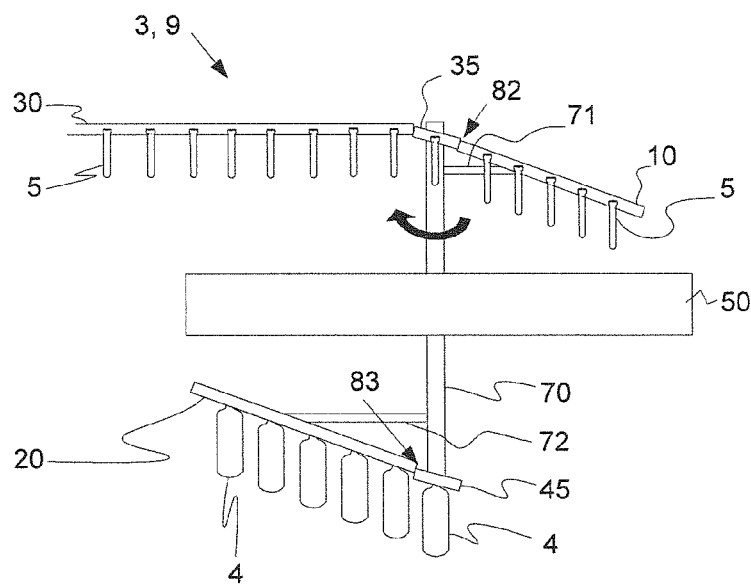
FIG. 8 shows a schematic side view of the container treatment plant having the transport device according to the third embodiment.

FIG. 7 and FIG. 8 show a container treatment plant 3 with its transport device 9 according to the third embodiment. The container treatment plant 3 of the third embodiment comprises essentially the same parts as the container treatment plant 1 of the first embodiment. Therefore, in the following, only the differences between the first and third embodiments are described. For the rest, it is referred to the description of the first and second embodiments. In FIG. 7 and FIG. 8, the heating devices 60 or 65 are not shown for the sake of simplification.

In contrast to the first embodiment, the supply of the parisons 5 is performed in the container treatment plant 3 of the third embodiment in a plane above the removal of the containers 4, wherein the first and second transport rails 30, 40 are also arranged to each other in another way than in the first embodiment. Further, the first transport star 10 rotates in another rotation direction than the second transport star 20, as shown in FIG. 7 by the small black rotation arrows. That means the first and second transport stars 10, 20 rotate in this embodiment opposite to each other. Furthermore, in the container treatment plant 3 of the third embodiment, the first and second transport star 10, 20 are no longer arranged such that they have their handover spot in the center of the blow molding machine 50. A third transport star 35 is arranged instead between the first transport star 10 and the first transport rail 30. This is also better shown in FIG. 8. Moreover, a fourth transport star 45 is arranged between the second transport star 20 and the second transport rail 40. Also this fourth transport star 45 is shown in FIG. 8 in more detail.

As depicted in FIG. 7, the first and second transport rails 30, 40 form a right angle to each other. Accordingly, the parisons 5 are guided by means of the first transport rail 30 from left in FIG. 7 and FIG. 8 to the third transport star 35 and are handed over to the third transport star 35 at the spot 82 (FIG. 8). After the handover of the parisons 5 by means of the third transport star 35 to the first transport star 10, the parisons 5 are introduced in the blow molding machine 50 from upwards. After finishing the containers 4 in the blow molding machine 50, the containers 4 are taken over by the second transport star 20, are handed over to the fourth transport star 45 at the spot 83 (FIG. 8), and then handed over from the fourth transport star 45 to the fourth transport rail 40 which guides the finished containers 4 downwards in FIG. 7 and out of the drawing plane of FIG. 8 in front of FIG. 8.

The implementation form according to the third embodiment is because of the third and fourth transport stars 35, 45 mechanically more complicated than the implementation forms of the first or second embodiments or the modifications of the first embodiment. Thus, to achieve the mechanically simplest solution, one of the implementation forms according to the first or second embodiment or the modifications of the first embodiment is preferred.

All of the above-described implementations of the container treatment plants 1, 2, 3, the transport devices 7, 8, 9 and the above-described transport method can be used separately or in all possible combinations thereof. The features of the first to third embodiments are combinable with each other arbitrarily. In addition, in particular, the following modifications are conceivable.

The elements shown in the figures are depicted schematically and can differ in the specific implementation from the forms shown in the figures provided that the above-described functions are ensured.

The container treatment plants 1, 2, 3 of the first to third embodiments can also be used for the treatment of glass bottles. Further, the container treatment plants 1, 2, 3 can comprise a blow molding machine 50, a cleaning machine, a filling machine, a labeling machine, etc. arranged in a row directly one after another so that the containers 4 each can be transported from the preceding machine to the subsequent machine by means of one of the described transport devices 7, 8, 9.

The heating means 60 in FIG. 2 can be microwave ovens, for example. Further, also the linear heating device 64 in FIG. 3 can be implemented as microwave oven. Principally, different heating devices are conceivable which heat by means of infrared or microwave radiation, for example. The heating devices 60, 65 can be combined arbitrarily with the described transport devices 7, 8, 9.

The first and second transport stars 10, 20 can be implemented as circular linear guides, as shown in the figures. However, the first and second transport stars 10, 20 can also be implemented as an inside arranged star having two arms.

The first and/or second transport rail 30, 40 can be implemented as transport star, too.

It is possible, that the first transport star 10 has another size than the second transport star 20. In such a case, the smaller transport star has to rotate faster than the bigger transport star.

In the third embodiment, the first and second transport stars 10, 20 can be, in relation to the third and fourth transport stars 35, 45, also smaller than depicted in FIG. 7 and FIG. 8. Accordingly, the third and fourth transport stars 35, 45 are to be designed larger in such case. Herein, the third and fourth transport stars 35, 45 are each to be arranged central in the ring of the blow molding machine 50, as shown in FIG. 7 and FIG. 8, such that a connection between the first transport star 10 and the first transport rail 30 via the third transport star 35 and a connection between the second transport star 20 and the second transport rail 40 via the fourth transport star 45 exists, as shown in FIG. 7 and FIG. 8. Also in this way, the same transfer time of transferring the parisons 5 to the blow molding machine 50 can be realized.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

What is claimed is:

1. A transport device for a container treatment plant, the transport device comprising:
    at least one transport star for transporting receptacles to or away from a treatment station of the container treatment plant,
    wherein the at least one transport star is arranged obliquely to the treatment station, wherein the at least one transport star comprises a first transport star for transporting receptacles to a treatment station of the container treatment plant, and a second transport star for transporting the receptacles away from the treatment station of the container treatment plant, wherein at least one of the first transport star and the second transport star is arranged obliquely to the treatment station; and
    wherein the first and second transport stars and the treatment station are movable relative to each other.

2. The transport device according to claim 1, wherein the first transport star is rotatable around a first rotation axis and the second transport star is rotatable around a second rotation axis, and wherein the first and second transport stars are rotatable together around a third rotation axis.

3. The transport device according to claim 2, wherein the first and second rotation axes are each arranged obliquely to the third rotation axis, and/or the first rotation axis is arranged in parallel to the second rotation axis.

4. The transport device according to claim 1, wherein the first transport star is arranged adjacent to the second transport star, such that the treatment station is arrangeable at the outside of a ring in which the first and second transport stars are arranged.

5. The transport device according to claim 4, wherein the first transport star is arranged such that the first transport star can take over the receptacles at a spot in the center of the ring to transport the receptacles to the treatment station, and wherein the second transport star is arranged such that the second transport star can hand over the receptacles at a spot in the center of the ring after having transported the receptacles.

6. The transport device according to claim 1, further comprising a tubular element for supplying a treatment station of the container treatment plant with parisons, wherein one transport star of the at least one transport star, which is arranged obliquely to the treatment station, serves for transporting the receptacles away from the treatment station of the container treatment plant.

7. The transport device according to claim 1, wherein the container treatment plant is a machine selected from the group consisting of a blow molding machine, a cleaning machine, a filling machine and a labeling machine.

8. A blow molding machine for producing containers, for accommodating a product, from parisons, comprising:
    a plurality of blowing stations forming together a ring and configured for shaping a container from a parison, and
    a transport device comprising at least one transport star for transporting one parison each to one of the plurality of blowing stations and for transporting one container each away from one of the plurality of blowing stations, wherein said at least one transport star is arranged obliquely to the treatment station.

9. The blow molding machine according to claim 8, wherein the transport device comprises a first transport star and a second transport star, and wherein the plurality of blowing stations are arranged stationary compared to first and second transport stars of the transport device.

10. A transport method for a container treatment plant, the transport method comprising the step of transporting receptacles to or away from a treatment station of the container treatment plant by at least one transport star, wherein the at least one transport star is arranged obliquely to the treatment station, wherein the at least one transport star comprises a first transport star for transporting receptacles to a treatment station of the container treatment plant, and a second transport star for transporting the receptacles away from the treatment station of the container treatment plant,
    wherein at least one of the first transport star and the second transport star is arranged obliquely to the treatment station; and
    wherein the first and second transport stars and the treatment station are movable relative to each other.

* * * * *